United States Patent
Figenschou

(10) Patent No.: US 8,723,030 B2
(45) Date of Patent: May 13, 2014

(54) VULCANISED POWER UMBILICAL

(75) Inventor: Arild Figenschou, Billingstad (NO)

(73) Assignee: Aker Subsea AS, Lysaker (NO)

(*) Notice: Subject to any disclaimer, the term of this patent is extended or adjusted under 35 U.S.C. 154(b) by 172 days.

(21) Appl. No.: 13/512,038

(22) PCT Filed: Nov. 29, 2010

(86) PCT No.: PCT/NO2010/000437
§ 371 (c)(1),
(2), (4) Date: May 25, 2012

(87) PCT Pub. No.: WO2011/065842
PCT Pub. Date: Jun. 3, 2011

(65) Prior Publication Data
US 2012/0234578 A1 Sep. 20, 2012

(30) Foreign Application Priority Data

Nov. 27, 2009 (NO) .................................. 20093437

(51) Int. Cl.
*H01B 7/00* (2006.01)
(52) U.S. Cl.
USPC ...................... 174/47; 174/110 R; 174/113 R
(58) Field of Classification Search
USPC ............ 174/47, 15.6, 15.7, 19, 113 C, 113 A, 174/102 R; 385/105, 110, 112, 114; 138/113
See application file for complete search history.

(56) References Cited

U.S. PATENT DOCUMENTS

| | | | | |
|---|---|---|---|---|
| 2,800,524 A | * | 7/1957 | Van Lear | 174/116 |
| 3,526,086 A | * | 9/1970 | Morgan | 138/111 |
| 4,256,146 A | * | 3/1981 | Genini et al. | 138/111 |
| 4,336,415 A | * | 6/1982 | Walling | 174/47 |
| 4,707,569 A | * | 11/1987 | Yoshimura et al. | 174/116 |
| 4,780,574 A | * | 10/1988 | Neuroth | 174/102 D |
| 5,261,462 A | * | 11/1993 | Wolfe et al. | 138/130 |
| 5,268,971 A | * | 12/1993 | Nilsson et al. | 385/101 |
| 5,495,547 A | * | 2/1996 | Rafie et al. | 385/101 |
| 5,813,106 A | * | 9/1998 | Haug et al. | 29/429 |
| 5,902,958 A | * | 5/1999 | Haxton | 174/47 |
| 6,253,012 B1 | | 6/2001 | Keller et al. | |
| 7,158,703 B2 | | 1/2007 | Mjelstad | |
| 7,381,900 B2 | | 6/2008 | Bremnes et al. | |
| 8,270,793 B2 | * | 9/2012 | Figenschou et al. | 385/101 |
| 8,304,651 B2 | * | 11/2012 | Figenschou et al. | 174/47 |
| 2010/0054677 A1 | | 3/2010 | Figenschou et al. | |

FOREIGN PATENT DOCUMENTS

| | | |
|---|---|---|
| NO | 328457 B1 | 2/2010 |
| WO | WO 2005/124095 A1 | 12/2005 |
| WO | WO 2005/124213 A1 | 12/2005 |
| WO | WO 2009/087363 A1 | 7/2009 |
| WO | WO 2011/059337 A1 | 5/2011 |

* cited by examiner

*Primary Examiner* — William H Mayo, III
(74) *Attorney, Agent, or Firm* — Birch, Stewart, Kolasch & Birch, LLP

(57) ABSTRACT

A power umbilical, a DEH power cable or general umbilical, including a plurality of high power cables for transfer of large amounts of electric energy, filler material in the form of stiff elongate plastic elements located at least partially around and between the high power cables, which together are collectively gathered in a spiraled bundle by means of a laying and closing operation, and a protective sheath that encapsulates the high power cables and the filler material is shown. The high power cables are at intervals in the longitudinal direction of the cables, provided with frictional material which cooperate with the filler material for frictional engagement with and load transfer between each other.

20 Claims, 5 Drawing Sheets

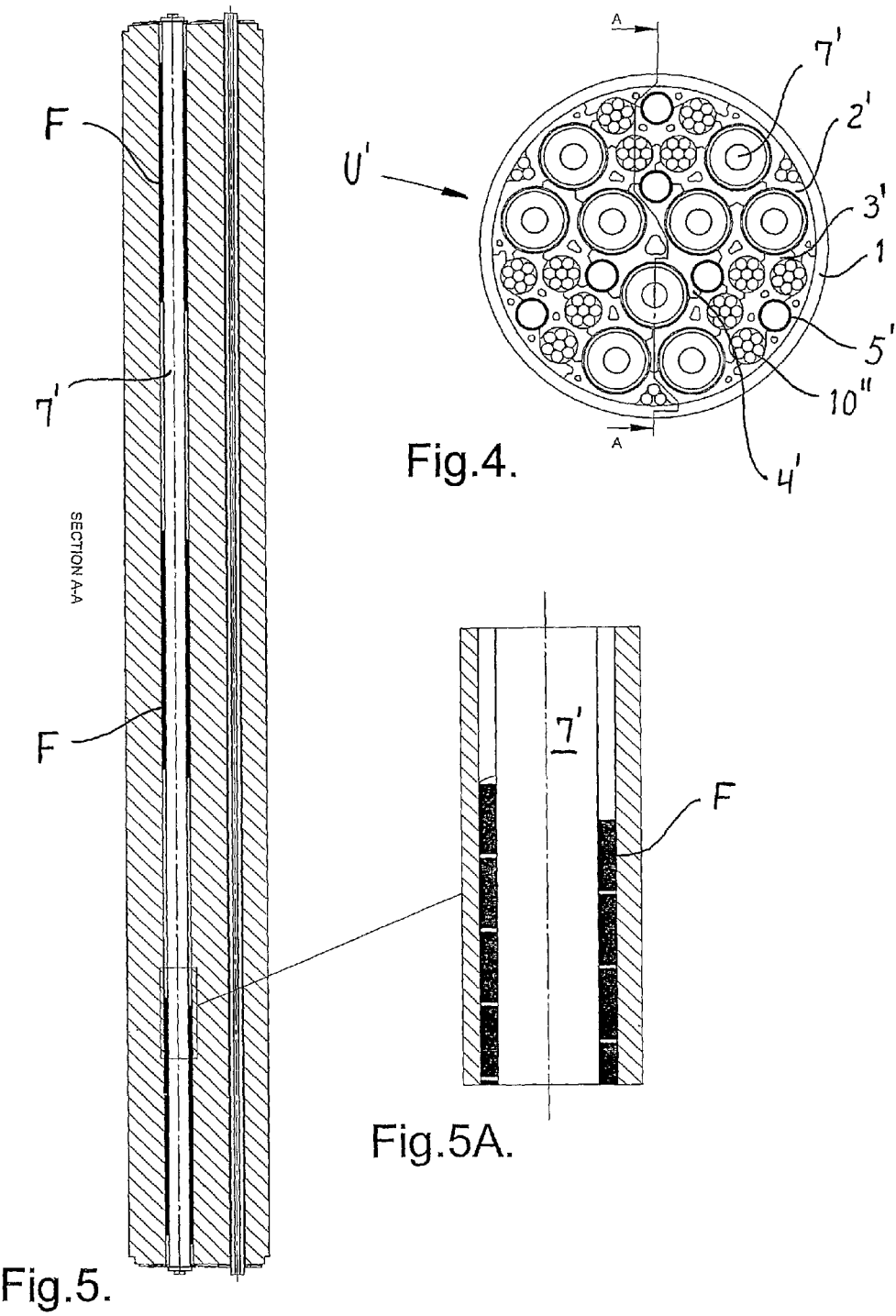

VULCANISED POWER UMBILICAL

CROSS-REFERENCES TO RELATED APPLICATIONS

This applicant is the national stage entry of PCT/NO10/00437, filed Nov. 29, 2010.

BACKGROUND OF THE INVENTION

1) Field of the Invention

The present invention relates to a power umbilical, a DEH power cable or general umbilical, including a plurality of high power cables for transfer of large amounts of electric energy, filler material in the form of stiff elongate plastic elements located at least partially around and between the high power cables and which together are collectively gathered in a spiraled bundle by means of a laying and closing operation, and a protective sheath that encapsulates the high power cables and the filler material.

Thus the present invention can be used on at least three main types of umbilicals/power cables; primarily on that we call a power umbilical of the nature described in WO 2005/124213; on a DEH cable (Direct Electric Heating) of the type described in PCT/NO2010/000395 and on a more traditional umbilical of the nature described in WO 2005/124095.

2) Description of the Related Art

As the oil and gas industry looks for ways to keep pace with the growing worldwide demand for oil, subsea developments are moving into ever increasing water depths and operators are looking towards subsea boosting technology as a means of getting the most out of their reservoirs. The power distribution umbilicals, which are needed to supply electrical power to the subsea boosting pumps, will be challenged by more extreme tension loads due to the deeper waters.

The traditional way to limit the strain in umbilicals is to increase the axial stiffness by adding steel armouring. But for very deep water applications, it soon became obvious that steel as armouring material would not work efficiently to reduce strain of an umbilical. If a structural member suspended from a top point is hanging vertically and exposed to its gravity load only, the strain close to the hang-off point is proportional to the free hanging length and density, but the opposite applies in relation to its stiffness. It is therefore obvious that materials used for stiffness enhancement lose effectiveness as the water depth grows. At a certain water depth the added weight from steel armouring increases the strain rather than reducing it. The problem of using steel as armouring material will typically start in water depths of 2000-2500 meters.

This has made the industry to look for light but still stiff material for umbilical stiffness enhancement. As a result of many years of development and testing, the present applicant has developed and patented a carbon fibre rod reinforced umbilical system. The carbon fibre rods, which are bundled into the umbilical alongside the other elements in the umbilical, have about the same stiffness but only one fifth of the density compared to steel. This change has eliminated all practical water depth limitations in terms of strain and stress induced by the gravity loads.

The control of strain is particularly important for the high and medium voltage electrical power umbilicals. A typical safe long term strain limitation of high power cables is in the range of 0.15% and this can easily be achieved for dynamic high power umbilicals using the carbon fibre rod system. The efficiency of the carbon fibre rod system has been proven in recent projects in water depths of 3000 meters.

The umbilical design of the applicant is based upon the bundling of the internal elements in a gradual spiral along the length of the umbilical. In some cases, and if necessary as an electrical requirement, a second layer is bundled over the inner bundle with the opposite spiral rotation. The umbilical will in such cases have a spiral core and a spiral layer that rotate counter-wise to each other along the length. The angles of the spiral relative to the centre line of the umbilical range between one to three degrees only. This gradual spiral provides several advantages, such as low rotational forces, and a high capacity to withstand axial compression forces of the umbilical.

The internals of the umbilical are held in place and separated by stiff plastic spacers, also called filler material, that run along the length of the umbilical. The spacers are shaped such that when bundled together they form internal longitudinal voids or cavities through which the tubes, or pipes, and cables pass. Each void is exactly dimensioned to suit the internal elements such as a tube or cable that it will contain, with an all round gap of approximately 1 mm. This provides the free movement within the umbilical during handling, and allows then umbilical to be spooled and reeled to the respective bending limits of flexibility of the internal elements.

The use of plastic spacers, the filler material, also provides benefits in the distribution of forces throughout the cross section of the umbilical when it is subjected to high squeeze pressures. Such a benefit is especially advantageous for deep water installation, as it helps prevent the caterpillar grip pressures causing damage to the umbilical internals.

Another important feature of the umbilical of the applicant having bundled elements in gradual spiral along the length of the umbilical is the improved fatigue life due to the low friction between the components.

Usually the umbilical of the applicant is sufficiently stiff and requires no additional stiffening along its length. But in some circumstances, especially in very deep waters and for high power cables, the umbilical needs to be reinforced to restrict excessive strain and stresses upon the bundle elements. Use of steel armouring just below the external sheath that encapsulates the bundle is unsuitable for two reasons; a) the weight of the armouring and hence the tension increases in proportion to the water depth, and b) the compressed spiral weave of the armouring results in loss of stiffness. Therefore in such cases, the umbilical of the applicant is reinforced with carbon fibre rods. The rods are bundled into the umbilical in the same manner as the internal elements such as tubes and cables. The relative density of carbon fibre is 1.6 times that of water compared to steel which is 7.85 times that of water, and therefore the carbon fibre rods contribute their full stiffness without the negative effects of added weight with the use of steel armouring. By using such technology the umbilical can be "tuned" to any depth of water and retain the required stiffness along its length.

One of the main challenges of designing a safe and reliable high power dynamic umbilical for deep water application is to control the forces and strain in the copper cores of the cables. The material properties of copper make it difficult to predict the forces over time as the combination of material creep and temperature effects, i.e. expansion and contraction, in the copper cores makes the evaluation of the fatigue life very uncertain. To minimise the fatigue of the cables in the dynamic bending zone, the applicant has developed a concept with the electrical power cables "free floating" in the dynamic bending zone, thus avoiding any uncontrolled loads upon the cables in the zone. The other load bearing elements of the umbilical bundle are; the steel tubes (if any) and carbon fibre rods are anchored at the top hang-off, but the electrical cables run through the hang-off without any constraint and are therefore free to expand and contract.

Instead of a topside cable termination, the cables are hung-off inside the umbilical with a "soft clamp system" according to the present invention. In one embodiment the "soft clamp system" is basically a vulcanized rubber sheath that is applied to the outside of the cable over a length of about ten meters, increasing the outer diameter and providing friction against the inside of the cable conduit in the umbilical, without creating a "hard point" between the surfaces.

Such "soft clamp" is located some 15 to 20 meters below the bend stiffener, and becomes the hang-off point of the power cables. From this point and up through the dynamic bending zone, the cables are free to expand, and are exposed to bending only, and therefore the forces upon the electrical cables become highly predictable. In one embodiment, descending below the hang-off point, the power cables are secured by frictional points in a special pattern over a length of about two meters at intervals of about fifty meters to counteract any long term creep/deformation of the copper cores. The "soft clamp system" protects the electrical cables from strain hardening and fatigue failure in the dynamic section.

Normally, as indicated above, the strength of a cable is an important issue when it comes to deep waters, substantial spans or under different circumstances when the cable is subjected to high loads. Phenomenas that are not so easy detectable also occurs. Due to the temperature generated in cables during operation and long term creeping of copper, a dynamic power umbilical is designed on that basis that the power conducting cables shall not contribute to any axial stiffness, only by its weight. This will be further detailed later in this description.

BRIEF SUMMARY OF THE INVENTION

In accordance with the present invention an umbilical/power umbilical of the introductory said kind is provided, which is distinguished in that the high power cables, at intervals in the longitudinal direction of the cables, are provided with frictional means which cooperate with the filler material for frictional engagement with and load and weight transfer to each other, while the high power cables between said vulcanisation spots extend freely in longitudinal cavities within the filler material for possible expansion and contraction for every single high power cable during alternating temperatures within the conductor of the high power cable. In this way the frictional means will provide hang-off points for the power cables within the filler material.

Shifting temperatures will occur due to conductor resistance varying in concert with the voltage, power and energy transfer, in addition to the ambient temperature.

Thus, the principle of the present invention is that each high power cable is "locked" to the filler material by means of a high frictional system, the "soft clamps", that is dispersed spot-wise or in fields along the umbilical. The frictional spots, that can be comprehended as discrete internal hang-off points for the high power cable along the umbilical, have a certain flexibility and a certain length. As previously indicated, these spots can typically be located by 50 to 100 meters apart, though by a minimum of one laying length. In this way the flexibility of the umbilical is maintained such that it can be reeled and handled as before without any additional forces are generated in the power cables caused by the frictional points. The forces that prevail in the power cable will now be transferred to other load carrying elements of the umbilical. These load carrying elements can typically be steel pipes or carbon fibre rods or other suitable elements. Even if it will be rare, the umbilical can in principle be without any load carrying elements in customary sense, for example on really shallow waters. As a result of this, the need for traditional armouring of power cables is eliminated.

As explained, another important effect is to stop the frictional spots a certain distance under the dynamic zone (in the bend stiffener zone) in order to let the high power cables pass "feely" through the bending zone without any strain or tension. This will partly eliminate uncontrollable and unknown forces that arise in this area. These forces are generated by thermal expansion and seepage within the electric copper cable cores. When a power cable is exposed for a change in temperature, it will freely be able to expand or contract in this area, above the uppermost high frictional point, without generating any forces of significance. The typical error mode for power cables without this system is kinking (Zeta-kinking) of single strands of the cable due to compression loads and transformations in material properties, such as strain-hardening for example.

Another important challenge with power umbilicals is to control the forces in the copper cores of the power cables in the dynamic zone. As the bending stiffener acts as an effective insulator and the upper region of the umbilical is in air, higher temperatures are involved. Higher temperatures expose the power cables to unpredictable forces caused by the thermal effects. This combined with creep in copper and strain hardening the fatigue life becomes highly unpredictable. The present invention overcomes this problem. As seen in FIG. 1, the topmost hang-off point is some distance below the tip of the bend stiffener. From this point and upwards, there is no restriction of the axial displacement of the power cables. The frictional means has a flexibility which prevents a hard loading point on the power cables as the load is gradually picked up over the length of the frictional means. The topmost frictional means takes the major part of the axial load, while a small residual axial load is taken by the subsequent frictional means below.

In various embodiments the frictional means can be in the form of a vulcanisation, a flexible glue or flexible epoxy like material.

The vulcanisation may take place by means of a vulcanisation tape that is coiled around the high power cable at dedicated spots.

In one embodiment the high power cables and the filler material can be SZ laid, i.e. laid and closed alternately by regularly shifting direction, in the entire or parts of the longitudinal extension of the power umbilical, combined with that the SZ laid bundle is retained substantially rotationally stiff by the protective sheath. As an alternative they are laid in a more traditional way in a helix in their entire longitudinal extension.

In another embodiment at least one load carrying element can be predetermined located in the transversal cross section of the power umbilical, where the at least one load carrying element is laid and closed in a SZ configuration, alternatively laid in a helix in the more traditional way, and is vulcanised to the filler material. Such vulcanisation may take place at intervals, not necessarily the same intervals as the vulcanisation of the high power cable.

In still another embodiment it may include electric wires and/or optical conductors which are laid and closed in a SZ configuration and are located inside the sheath. Alternatively, they may be laid in a helix in the more traditional way, and is vulcanised to the filler material.

In addition it may include an anti rotation band, or a strength ribbon, or a tape, which is helically winded around the bundle just inside the sheath. As an alternative, the strength ribbon, or the tape, can be helically winded around the bundle in two or more layers, laid and closed in opposite directions.

The load carrying elements can be at least one among the following elements: carbon fibre rods, steel wire, fibre rope or steel rope.

In addition it may in still another embodiment include at least one fluid pipe in its transversal cross section, made of metal and/or plastic material. They will be laid and closed in the same configuration as the other elements.

The laying and closing of the high power cables, the possible electric wires and/or optical conductors, the filler material and the at least one load carrying element can make about one half to three revolutions before it alters direction.

As a summary, it is to be said that the high power cables are in the longitudinal direction of the umbilical spot-wise vulcanised to the filler material for frictional engagement or binding to each other. Further, the power cables extend freely in voids or cavities within the filler material between said vulcanisation spots in order to create a possibility to expand and contract by alternating temperatures within the conductor proper of the power cable.

It is to be understood that if the power cable extends freely all the way within said void, the copper conductor itself tends to creep an increment each time the temperature changes, for example when the conductor supplies power and not. This can be explained in the following way. The high power cable is laying as a spiraled string, or in a helix, within the longitudinal voids formed in the filler material. The cable will behave as a twining plant does to cling to something in order to avoid sagging down. As known, if the conductor is made of copper it has a substantial weight which makes it to tend to sag down when such a string extends substantially vertical over several thousands meters. However, the helix will contribute to that the twining plant effect will arise which makes it cling to the filler material and sits stable in a frictional way to the filler material as long as the temperature is stable.

When the power is switched on, heat is developed within the conductor and the conductor expands. In such lengths as are discussed here, this longitudinal expansion will be substantial. The longitudinal expansion makes the twining plant effect above to decrease and the cling against the filler material is lowered. This, however, makes no problem in first occurrence. When the power is switched off the conductor is getting colder and contracts again. However, it will cling again when contracted, but firstly in that end having longest expansion. Thus the creeping effect arises.

BRIEF DESCRIPTION OF THE DRAWING(S)

Other and further objects, features and advantages will appear from the following description of preferred embodiments of the invention, which are given for the purpose of description, and given in context with the appended drawings where:

FIG. 1 shows schematically an umbilical extending between a floating structure and the sea bed and where exemplary frictional spots are marked within the umbilical, FIG. 2 shows a transversal cross sectional view through an actual umbilical section, FIG. 3 shows partly in perspective view a section corresponding to that in FIG. 2, FIG. 4 shows a transversal cross sectional view through another embodiment of an umbilical, FIG. 5 shows a longitudinal cross section along line A-A in FIG. 4 (note that the section line is not rectilinear)

FIG. 5A shows a circumscribed detailed section of FIG. 5,

DETAILED DESCRIPTION OF THE INVENTION

Figure 1:
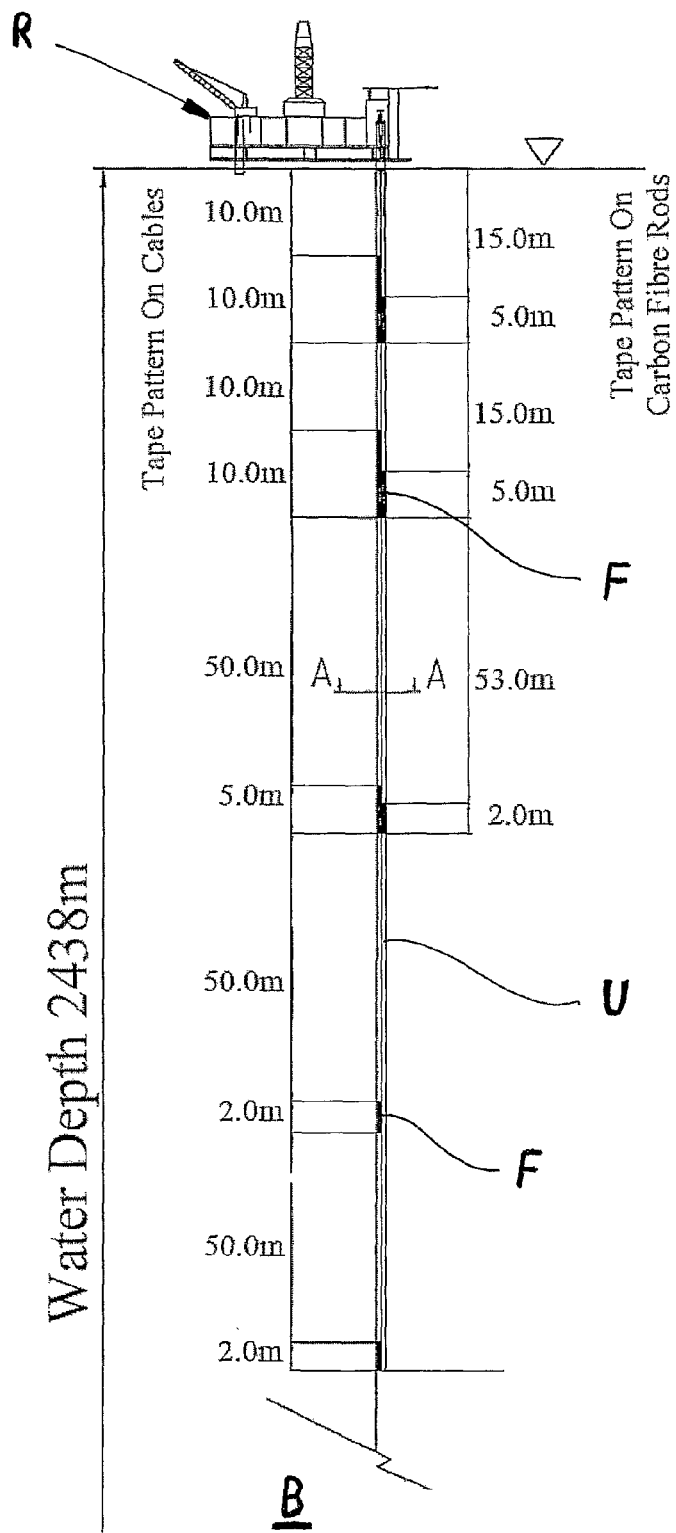

With reference to FIG. 1, a structure R floating on the sea surface is firstly shown. The structure, or the rig, do not make any part of the invention, but is shown in order to illustrate a possible usage of the invention.

An umbilical U extends between the floating rig R and the seabed B and is schematically illustrated in the drawing. Further, where the intended frictional spots F (black fields) within the umbilical are located, are schematically marked. This is to be considered as examples without that these sizes, lengths and intervals should be considered to be limitations as lengths and dimensions concerns. These sizes can vary from one application to another. In addition, a water depth of 2483 meters is indicated as an example, just to illuminate that the umbilical can be deployed at considerable water depths.

Each frictional spot, or more correctly frictional length, is in an actual embodiment realized as a vulcanisation of rubber between inner components within the umbilical U. Later, in connection with FIGS. 4 and 5, this will be described in closer detail. Typical distances between the frictional spots can be from 10-100 meters. Note that a shorter distance between the frictional spots preferably is present at high levels near the surface, contrary to that further down towards the seabed. Further, it may be differences in the frictional lengths, i.e. how long the lengths that are vulcanised are. Here, lengths of about 2-10 meters are indicated, without that this should be considered as a limitation.

The frictional spot intervals and frictional lengths can also vary in accordance with which inner elements that are vulcanised to each other. Look to the right hand side in FIG. 1. This illustrates vulcanisation intervals for a typical load carrying element, such as carbon fibre rods, to a filler material, or channel elements, normally made of PVC. Left hand side shows vulcanisation intervals for a typical electric cable, such as a high voltage power cable, to the filler material, or the channel elements. FIG. 1 also shows various vulcanisation lengths for the different elements.

One way to perform a vulcanisation operation is to make use of cold vulcanisation by use of a specially designed rubber tape, spiraled, or winded, around the elements in the lengths and intervals indicated. When the tape is winded and the elements are put together, they are vulcanised to each other in a pretty short time. It is to be mentioned that it is conceivable to use resilient glue as a replacement for vulcanisation, or other suitable means that is able to create sufficient friction between the components of the umbilical so that loads can be transferred between them.

Figure 2:
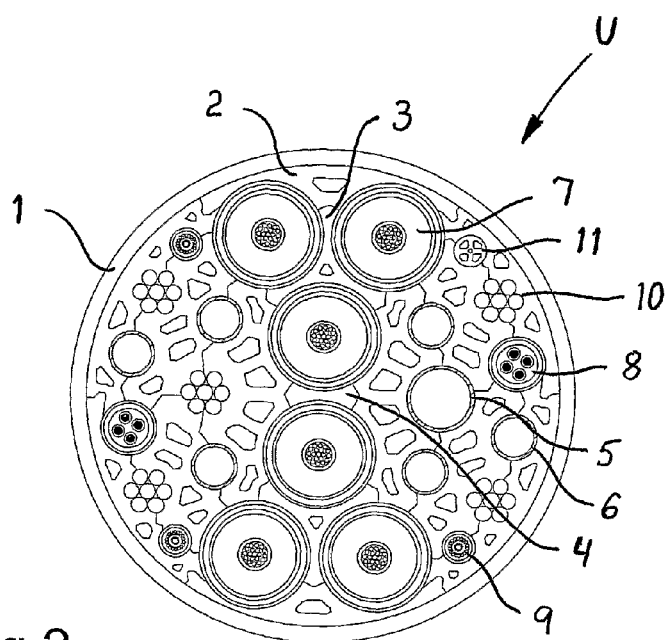

Now to the umbilical U itself, which is schematically shown in transversal cross section in FIG. 2. The umbilical U is basically constructed of the following elements: a bundle of elongate elements comprising inner, intermediate and outer channel elements 4, 3, 2, at least one high power cable 7 (here show a total of six) for transfer of large amounts of electric power/energy, regular electric low voltage wires 8 collected in one or more bundles to transfer pilot, signal and control currents, etc., optical conductors 9, fluid pipes, or conduits, 5, 6 and load carrying elements 10, that are laid and closed together into said bundle, and an outer sheath 1 that encapsulates the bundle. Normally the sheath 1 is extruded onto the bundle of elements and is of polyethylene. In addition a fill substance 11 can be present in order to balance out the optical cable 9. The laying and closing operation is either SZ or the traditional helical laying. The channel elements 4, 3, 2 can for example be made of polyvinylchloride (PVC).

It is to be understood that the above described umbilical is a sophisticated embodiment having the most conceivable elements present in the cross section. The simplest embodiment, a pure power cable like the DEH cable, will only include a bundle of elongate elements consisting of inner and outer channel elements 3, 2, high power cables 7 to transfer large amounts of electric power/energy and the protective outer sheath 1. The presence of regular low voltage wires 8, optical conductors 9, fluid pipes 5, 6 and load carrying elements 10, will be as desired in accordance with the particular application of the cable or umbilical. It is still to be noticed that one or more load carrying elements 10 normally will be present, though still not strictly necessary, for example in small water depths.

When the load carrying elements 10 are in the form of carbon fibre rods, here shown as five bundles each consisting of seven individual rods 10', each single rod 10' will typically have a diameter of 6.5 mm. The carbon fibre rods 10' normally have a carbon fibre filling of approximately 70%, they have strength at rupture of about 50 kN combined with an axial stiffness EA of about 4.97N. This is approximately the same stiffness that would be generated of a steel rod having the same size (diameter of 6.5 mm), but without the negative weight relations that would be generated by use of steel armouring. The weight contribution from the carbon fibre rods are about 20% of steel only, since the density of the carbon fibre rods are only 1.6 compared with 7.85 for steel. Naturally this makes carbon fibre rods very efficient as armouring material for deepwater umbilicals.

As possible alternatives, when carbon fibre rods are not required, the load carrying elements 10 can be in the form of steel wires that are spiraled into bundles, or fibre ropes of appropriate nature and strength.

Figure 3:
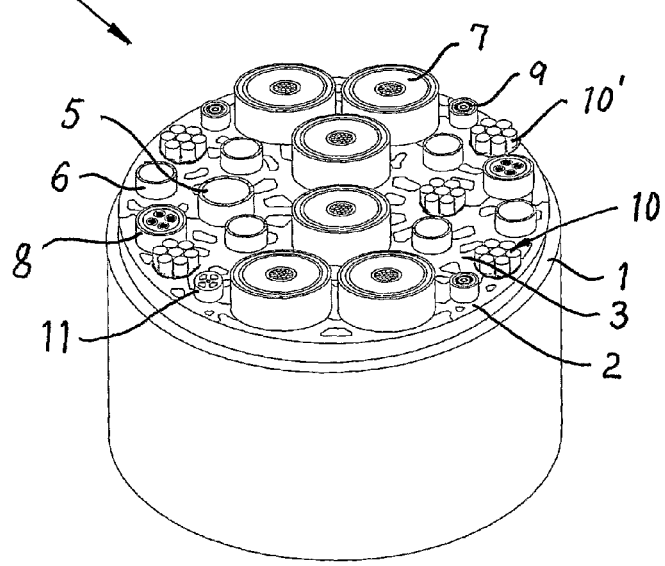

With reference to FIG. 3, the umbilical U that is schematically shown in transversal cross section in FIG. 2, is now shown partly in perspective view, such that it should be easier to form a picture of how this umbilical actually looks like if it is chopped off. The umbilical U is as before basically constructed of the following elements: a bundle of elongate elements comprising inner, intermediate and outer channel elements 4, 3, 2, at least one high power cable 7 (here show a total of six) for transfer of large amounts of electric power/energy, regular electric low voltage wires 8 collected in one or more bundles to transfer pilot, signal and control currents, etc., optical conductors 9, fluid pipes, or conduits, 5, 6 and load carrying elements 10, that are laid and closed together into said bundle, and an outer sheath 1 that encapsulates the bundle. Normally the sheath 1 is extruded onto the bundle of elements and is of polyethylene. In addition a fill substance 11 can be present in order to balance out the optical cable 9. The laying and closing operation is either SZ or the traditional helical laying. The channel elements 4, 3, 2 can for example be made of polyvinylchloride (PVC).

With reference to FIG. 4, a variant of an umbilical U' is schematically shown in transversal cross section. The umbilical U' is basically constructed of the following elements: a bundle of elongate elements comprising inner, intermediate and outer channel elements 4', 3', 2', at least one high power cable 7' (here show a total of nine) for transfer of large amounts of electric power/energy, fluid pipes, or conduits, 5' and load carrying elements 10", that are laid and closed together into said bundle. The laying and closing operation is either SZ or the traditional helical laying. The channel elements 4', 3', 2' can for example be made of polyvinylchloride (PVC).

FIG. 5 shows a longitudinal cross section through the umbilical U', and FIG. 5A shows this in closer detail. It is to be noted that the longitudinal cross section does not extend along a straight line—confer line A-A in FIG. 4. The umbilical U' has a construction like that shown in FIG. 4, but only one high power cable 7' and one load carrying element 10" is sectioned. As shown by the black fields F, the high power cables 7' are, at intervals in the longitudinal extension of the power umbilical, vulcanised to the filler material 2', 3', 4' for frictional binding and load transfer between each other. Moreover, between the vulcanisation fields, the high power cables 7' extend freely in longitudinal cavities within the filler material 2', 3', 4' in order to enable expansion and contraction in each individual high power cable 7' at alternating temperatures within the conductor of the high power cable 7'.

Figure 6:
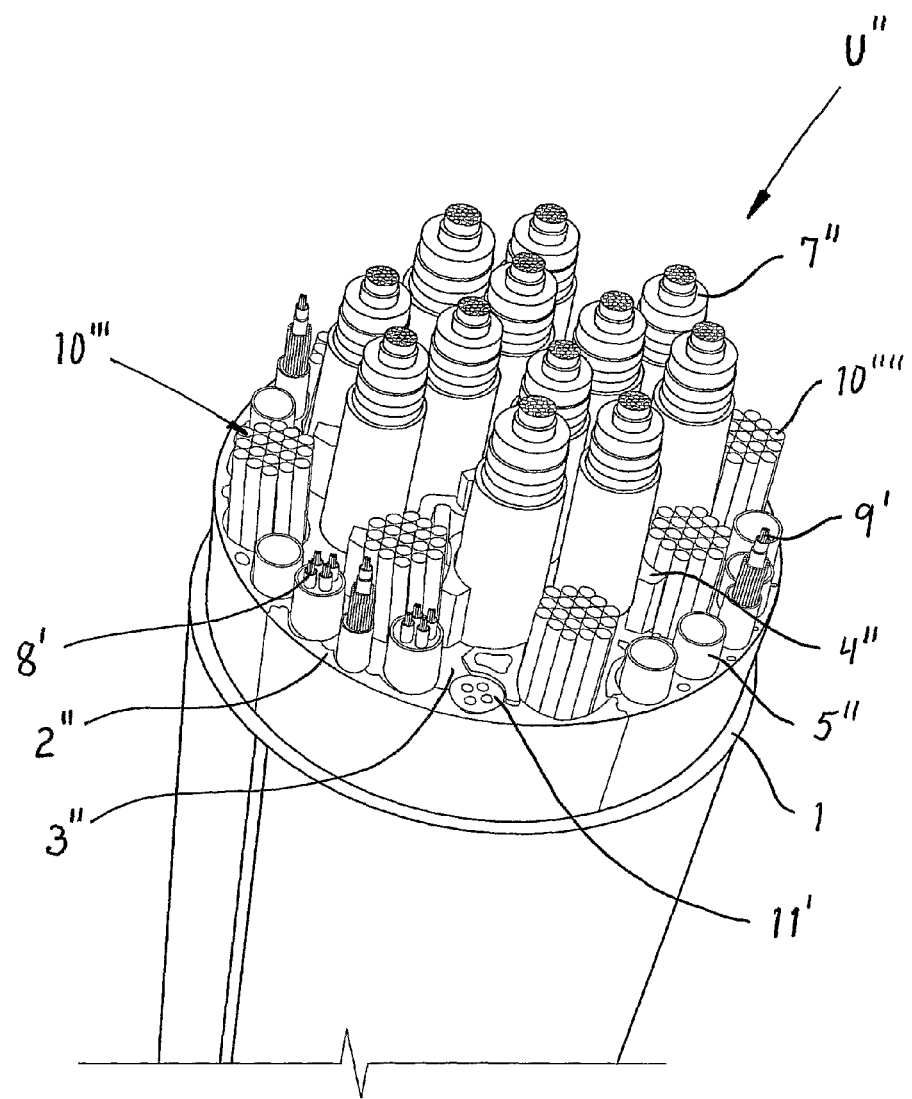
FIG. 6 shows partly in perspective view still another embodiment of an umbilical.

FIG. 6 shows a power umbilical U" that is shown partly in perspective view, such that it should be easier to form a picture of the umbilical U" components. The umbilical U" is as before basically constructed of the following elements: a bundle of elongate elements comprising inner, intermediate and outer channel elements 4", 3", 2", at least one high power cable 7" (here show a total of twelve) for transfer of large amounts of electric power/energy, regular electric low voltage wires 8' collected in one or more bundles to transfer pilot, signal and control currents, etc., optical conductors 9', fluid pipes, or conduits, 5' and load carrying elements 10''', that are laid and closed together into said bundle, and an outer sheath 1 that encapsulate the bundle. Each load carrying element 10''' is in turn made up of a bundle of individual rods, here shown as nineteen individual carbon fiber rods 10''''. Normally the sheath 1 is extruded onto the bundle of elements and is of polyethylene. In addition a fill substance 11' can be present in order to balance out the optical cable 9'. The laying and closing operation is either SZ or the traditional helical laying. The channel elements 4", 3", 2" can for example be made of polyvinylchloride (PVC).

Figure 7:
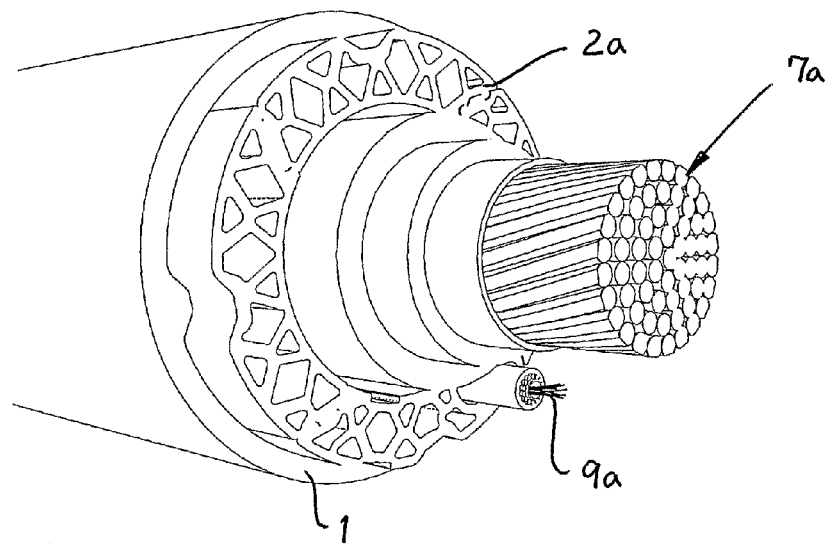
FIG. 7 shows a typical DEH cable.
Figure 8:
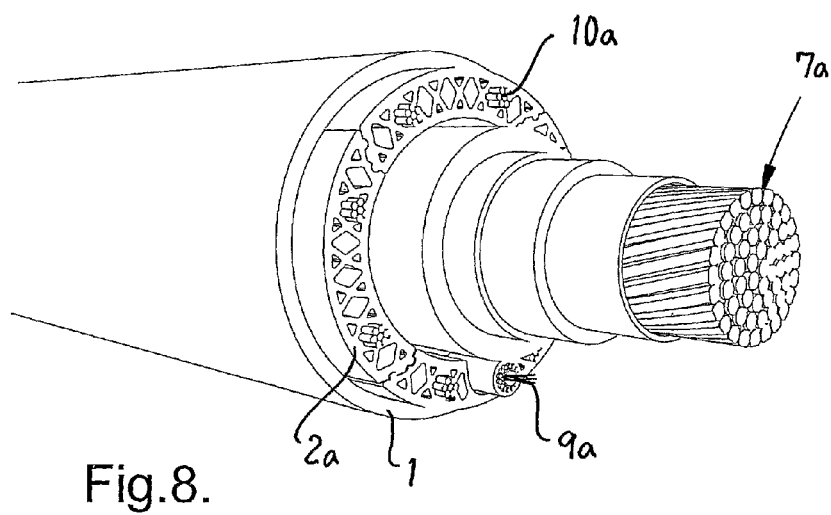
FIG. 8 shows a typical DEH cable having load carrying elements integrated.

FIG. 7 shows a typical DEH cable, which can be considered as the simplest embodiment for use with the present invention. The DEH cable will only include a circular bundle of elongate channel elements 2a, one single high power cable 7a to transfer really large amounts of electric power/energy and the protective outer sheath 1a. The presence of regular low voltage wires, optical conductors 9a, and load carrying elements 10a, will be as desired in accordance with the particular application of the DEH cable. It is still to be noticed that one or more load carrying elements 10a, as illustrated in FIG. 8, normally will be present, though still not strictly necessary, for example in small water depths.

To be considered as a non limiting illustration and example, a typical carbon fibre rod of 6.5 mm diameter will have 68 volume % of its cross section to consist of 550000 individual fibres and these filaments provides the carbon fibre rod its high strength properties in the filament direction. The remaining 32 volume % consists of high end resin which ensures forces distribution between the filaments. The stiffness modulus of a composite carbon fibre reinforced rod is approx. 150000 MPa compared to 200000 MPa for steel.

The invention claimed is:

1. A power umbilical, a DEH power cable or general umbilical, including a plurality of high power cables for transfer of large amounts of electric energy, filler material in the form of stiff elongate plastic elements located at least partially around and between the high power cables and which together are collectively gathered in a spiralled bundle by means of a laying and closing operation, and a protective sheath that encapsulates the high power cables and the filler material, wherein the high power cables, at intervals in the longitudinal direction of the cables, are provided with frictional means which cooperate with the filler material for frictional engagement with and load and weight transfer to each other, while the high power cables between said vulcanisation spots extend freely in longitudinal cavities within the filler material for possible expansion and contraction of every single high power cable during alternating temperatures within the conductor of the high power cable.

2. The power umbilical, the DEH power cable or the general umbilical according to claim 1, wherein the frictional means is in the form of a vulcanisation, alternatively a flexible glue.

3. The power umbilical, the DEH power cable or the general umbilical according to claim 2, characterized in that the vulcanisation takes place by means of a vulcanisation tape that is winded around the high power cable at dedicated spots.

4. The power umbilical, the DEH power cable or the general umbilical according to claim 2, wherein the high power cable and the filler material are SZ laid, i.e. laid and closed alternately by regularly shifting direction, in the entire or parts of the longitudinal extension of the power umbilical, combined with that the SZ laid bundle is retained substantially rotationally stiff by the protective sheath, alternatively laid in a helix.

5. The power umbilical, the DEH power cable or the general umbilical according to claim 2, wherein at least one load carrying element is predetermined located in the transversal cross section of the power umbilical, which at least one load carrying element is laid and closed in a SZ configuration, alternatively laid in a helix, and is vulcanised to the filler material, preferably at intervals.

6. The power umbilical, the DEH power cable or the general umbilical according to claim 2, wherein t it includes electric wires and/or optical conductors which are laid and closed in a SZ configuration and are located inside the sheath, alternatively laid in a helix, and is vulcanised to the filler material.

7. The power umbilical, the DEH power cable or the general umbilical according to claim 1, wherein the vulcanisation takes place by means of a vulcanisation tape that is winded around the high power cable at dedicated spots.

8. The power umbilical, the DEH power cable or the general umbilical according to claim 7, wherein the high power cable and the filler material are SZ laid, i.e. laid and closed alternately by regularly shifting direction, in the entire or parts of the longitudinal extension of the power umbilical, combined with that the SZ laid bundle is retained substantially rotationally stiff by the protective sheath, alternatively laid in a helix.

9. The power umbilical, the DEH power cable or the general umbilical according to claim 7, wherein at least one load carrying element is predetermined located in the transversal cross section of the power umbilical, which at least one load carrying element is laid and closed in a SZ configuration, alternatively laid in a helix, and is vulcanised to the filler material, preferably at intervals.

10. The power umbilical, the DEH power cable or the general umbilical according to claim 7, wherein t it includes electric wires and/or optical conductors which are laid and closed in a SZ configuration and are located inside the sheath, alternatively laid in a helix, and is vulcanised to the filler material.

11. The power umbilical, the DEH power cable or the general umbilical according to claim 1, wherein the high power cable and the filler material are SZ laid, i.e. laid and closed alternately by regularly shifting direction, in the entire or parts of the longitudinal extension of the power umbilical, combined with that the SZ laid bundle is retained substantially rotationally stiff by the protective sheath, alternatively laid in a helix.

12. The power umbilical, the DEH power cable or the general umbilical according claim 11, wherein the load carrying are at least one among the following elements: carbon fibre rods, steel wire, fibre rope or steel rope.

13. The power umbilical, the DEH power cable or the general umbilical according to claim 11, wherein at least one load carrying element is predetermined located in the transversal cross section of the power umbilical, which at least one load carrying element is laid and closed in a SZ configuration, alternatively laid in a helix, and is vulcanised to the filler material, preferably at intervals.

14. The power umbilical, the DEH power cable or the general umbilical according to claim 11, wherein t it includes electric wires and/or optical conductors which are laid and closed in a SZ configuration and are located inside the sheath, alternatively laid in a helix, and is vulcanised to the filler material.

15. The power umbilical, the DEH power cable or the general umbilical according to claim 1, wherein at least one load carrying element is predetermined located in the transversal cross section of the power umbilical, which at least one load carrying element is laid and closed in a SZ configuration, alternatively laid in a helix, and is vulcanised to the filler material, preferably at intervals.

16. The power umbilical, the DEH power cable or the general umbilical according to claim 15, wherein t it includes electric wires and/or optical conductors which are laid and closed in a SZ configuration and are located inside the sheath, alternatively laid in a helix, and is vulcanised to the filler material.

17. The power umbilical, the DEH power cable or the general umbilical according to claim 1, wherein t it includes electric wires and/or optical conductors which are laid and closed in a SZ configuration and are located inside the sheath, alternatively laid in a helix, and is vulcanised to the filler material.

18. The power umbilical, the DEH power cable or the general umbilical according to claim 1, wherein it includes an anti rotation band or strength ribbon, or a tape, which is helically winded around the bundle just inside the sheath, alternatively the strength ribbon, or the tape, is helically winded around the bundle in two or more layers, laid and closed in opposite directions.

19. The power umbilical, the DEH power cable or the general umbilical according to claim 1, wherein it includes at least one fluid pipe in its transversal cross section, of metal and/or plastic material, laid and closed in the same configuration as the other elements.

20. The power umbilical, the DEH power cable or the general umbilical according to claim 1, wherein the laying and closing of the high power cables, the possible electric wires and/or optical conductors, the filler material and the at least one load carrying elements make about one half to three revolutions before it alters direction.

* * * * *